(12) United States Patent
Nam et al.

(10) Patent No.: US 11,594,923 B2
(45) Date of Patent: Feb. 28, 2023

(54) ROTOR AND MOTOR INCLUDING THE SAME

(71) Applicant: Samsung Electronics Co., Ltd., Suwon-si (KR)

(72) Inventors: Yongwoo Nam, Suwon-si (KR); Deokjin Kim, Suwon-si (KR); Ukho Seo, Suwon-si (KR); Jaewoong Jung, Suwon-si (KR); Youngkwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 17/030,097

(22) Filed: Sep. 23, 2020

(65) Prior Publication Data

US 2021/0091617 A1    Mar. 25, 2021

(30) Foreign Application Priority Data

Sep. 25, 2019 (KR) .......................... 10-2019-0118403

(51) Int. Cl.
*H02K 1/276* (2022.01)
*H02K 1/28* (2006.01)
*H02K 29/03* (2006.01)

(52) U.S. Cl.
CPC ............. *H02K 1/2773* (2013.01); *H02K 1/28* (2013.01); *H02K 29/03* (2013.01)

(58) Field of Classification Search
CPC ......... H02K 1/2773; H02K 1/28; H02K 29/03
USPC .......................... 310/156.29, 156.01, 156.48
See application file for complete search history.

(56) References Cited

U.S. PATENT DOCUMENTS

2015/0244218 A1    8/2015  Kaufmann et al.

FOREIGN PATENT DOCUMENTS

| CN | 202634112 U | * | 12/2012 | ........... H02K 1/2773 |
|----|-------------|---|---------|---------|
| CN | 105958691 A | * | 9/2016 | |
| DE | 102008041604 A1 | * | 3/2010 | ............. H02K 1/276 |
| DE | 102013213554 A1 | * | 3/2014 | ........... H02K 1/2773 |
| DE | 102017208280 A1 | * | 11/2018 | ............. H02K 1/146 |
| KR | 10-2013-0084175 A | | 7/2013 | |
| KR | 2016053560 A | * | 5/2016 | |
| KR | 10-2016-0132512 A | | 11/2016 | |
| KR | 10-2017-0082282 A | | 7/2017 | |
| WO | WO-2014027631 A | * | 2/2014 | ............. H02K 1/276 |

(Continued)

OTHER PUBLICATIONS

Machine Translation of CN 202634112 U (Year: 2012).*

(Continued)

*Primary Examiner* — Jose A Gonzalez Quinones (57) ABSTRACT

A rotor and a motor including the same. The motor includes a stator and a rotor configured to rotate by interacting with the stator. The rotor includes a plurality of permanent magnets disposed in a circumferential direction of the rotor and rotor cores disposed between the plurality of permanent magnets. The rotor core includes a notch cut inward from a circumferential surface thereof, and the notch is formed in an asymmetric shape. The rotor core has a notch formed on one side of the circumferential surface and the rotor core has a shape inverted left and right with the rotor core are alternately stacked, so that a magnitude of a synthetic cogging torque generated in the rotor is reduced.

17 Claims, 9 Drawing Sheets

(56) References Cited

FOREIGN PATENT DOCUMENTS

WO     WO2018025407 A1 *    2/2018
WO     WO-2019065119 A1 *    4/2019    ............... H02K 1/22

OTHER PUBLICATIONS

Machine Translation of CN 105958691 A (Year: 2016).*
Machine Translation of KR 2016053560 A (Year: 2016).*
Machine Translation of WO 2014027631 A1 (Year: 2014).*
Machine Translation of WO 2019065119 A1 (Year: 2019).*
Machine Translation of DE 102008041604 A1 (Year: 2010).*
Machine Translation of DE 102013213554 A1 (Year: 2014).*
Machine Translation of DE 102017208280 A1 (Year: 2018).*

* cited by examiner

| PERFORMANCE COMPARISON | NOTCH NOT FORMING | NOTCH SYMMETRY | NOTCH ASYMMETRY |
|---|---|---|---|
| COUNTER ELECTROMOTIVE FORCE (Vrms @ 750rpm) | 84.0 | 84.0 | 84.0 |
| SYNTHETIC COGGING TORQUE (mNm) | 45.0 | 30.0 | 20.0 |

1

ROTOR AND MOTOR INCLUDING THE SAME

CROSS-REFERENCE TO RELATED APPLICATION

This application is based on and claims priority under 35 U.S.C. § 119 to Korean Patent Application No. 10-2019-0118403, filed on Sep. 25, 2019, in the Korean Intellectual Property Office, the disclosure of which is incorporated by reference herein in its entirety.

BACKGROUND

1. Field

The disclosure relates to a rotor having an improved structure by providing a notch and a motor including the same.

2. Description of the Related Art

A motor, which is a machine that obtains a rotational force from electric energy, may include a stator and a rotor. The rotor is configured to electromagnetically interact with the stator and may be rotated by a force acting between a magnetic field and a current flowing through a coil.

Permanent magnet motors that use permanent magnets to generate a magnetic field may include a surface mounted permanent magnet motor, an interior type permanent motor, and a spoke type permanent magnet motor.

Among these, the spoke type permanent magnet motor may generate high torque and high output due to structurally high magnetic flux density and may miniaturize a motor with respect to the same output.

However, in the spoke type permanent magnet motor, a cogging torque may be generated between a magnetic flux generated from a rotor and a slot of a stator. Due to the cogging torque, vibration and noise may occur depending on the shape of a rotor.

To reduce such vibration and noise, tapering may be performed on the shapes of the rotor and the stator, but the output of the motor may be reduced due to this.

SUMMARY

It is an aspect of the disclosure to provide a rotor capable of obtaining high output when rotating and a motor including the same.

It is another aspect of the disclosure to provide a rotor having an improved structure by forming a notch to reduce a cogging torque formed between the rotor and a stator, and a motor including the rotor.

It is another aspect of the disclosure to provide a rotor having an improved structure such that one rotor core having a notch on one side to reduce a cogging torque and the other rotor core having a shape that is inverted left and right to the one rotor core are alternately stacked.

Additional aspects of the disclosure will be set forth in part in the description which follows and, in part, will be obvious from the description, or may be learned by practice of the disclosure.

In accordance with an aspect of the disclosure, a motor includes a stator on which the coil is wound, and a rotor configured to rotate by interacting with the stator, wherein the rotor includes a first permanent magnet and a second permanent magnet disposed in a circumferential direction of the rotor to form a magnetic field, and a rotor core disposed between the first permanent magnet and the second permanent magnet, and wherein the rotor core includes a notch formed by being cut inward from a circumferential surface thereof adjacent to the first permanent magnet.

The notch may include a first notch surface adjacent to a core center line extending radially from a motor shaft to pass through a center of the rotor core, a second notch surface formed by being cut from the circumferential surface adjacent to the first permanent magnet, and a notch valley formed at a point where the first notch surface and the second notch surface come into contact with each other, and an angle formed by the first notch surface and a notch reference line passing through the notch valley in parallel with the first permanent magnet may be different from an angle formed by the second notch surface and the notch reference line.

The rotor core may be a first rotor core, the motor may further include a second rotor core stacked with the first rotor core in a shaft direction of the motor, and the second rotor core may have a shape inverted left and right based on the core center line.

A depth from the circumferential surface of the rotor core to the notch valley may be less than or equal to a half of a radius of the rotor core.

The first notch surface may be formed inward from the core center line.

The rotor core may further include a permanent magnet fixing portion protruding in the circumferential direction from the notch to fix the first permanent magnet.

The permanent magnet fixing portion may be a first permanent magnet fixing portion, and the rotor core may further include a second permanent magnet fixing portion protruding in the circumferential direction from the circumferential surface of the rotor core to fix the second permanent magnet.

The first permanent magnet fixing portion may include a first permanent magnet support surface in surface contact with the permanent magnet to prevent the permanent magnet from being separated, and the second permanent magnet fixing portion may include a second permanent magnet support surface in surface contact with the permanent magnet to prevent the permanent magnet from being separated.

The minimum distance from a point, where the first permanent magnet support surface and a side end portion of the rotor core come into contact with each other, to the notch may be equal to or greater than a thickness of the rotor core.

In accordance with another aspect of the disclosure, a rotor of a motor includes a plurality of permanent magnets disposed in a circumferential direction to form a magnetic field, and rotor cores disposed between the plurality of permanent magnets.

The rotor core may include a first portion positioned on one side thereof based on a core center line extending in a radial direction from a motor shaft to pass through a center of the rotor core, and a second portion positioned on the other side thereof based on the core center line, and the first portion may include a notch of an asymmetrically shape formed by being cut inward from a circumferential surface of the rotor core.

The notch may be formed such that an angle at which one side thereof is cut is different from an angle at which the other side thereof is cut, based on a notch reference line passing through a valley of the notch in parallel with the permanent magnet adjacent to the notch.

The rotor core may be a first rotor core, the rotor may further include a second rotor core stacked with the first rotor core in a shaft direction of the rotor, and the second rotor core may have a shape inverted left and right with the first rotor core based on the core center line to reduce a cogging torque.

The maximum cutting depth of the notch in a radial direction may be less than or equal to a half of a radius of the rotor core.

An angle at which one side of the notch is cut may be less than or equal to an angle formed by the notch reference line and the core center line.

The rotor core may include a plurality of permanent magnet fixing portion protruding in the circumferential direction from opposite ends of the rotor core, respectively, to fix the plurality of permanent magnets.

In accordance with another aspect of the disclosure, a cylindrical rotor includes a plurality of permanent magnets disposed in a circumferential direction to form a magnetic field, a first rotor core disposed between the plurality of permanent magnets, and a second rotor core stacked in an axial direction with the first rotor core, wherein the first rotor core comprises a notch formed on a circumferential surface of one side thereof based on a core center line extending in a radial direction from a motor shaft to pass through a center of the first rotor core, and wherein the second rotor core has a shape inverted left and right with the first rotor core to reduce a cogging torque.

The notch may be cut in an asymmetric shape.

The notch may include a first notch surface formed by being cut from a circumferential surface of the first rotor core adjacent to the core center line, and a second notch surface formed to face the first notch surface in the circumferential direction of the rotor.

The notch may further include a notch valley formed at a point where the first notch surface and the second notch surface come into contact with each other, and an angle formed by the first notch surface and a notch reference line passing through the notch valley in parallel with the permanent magnet adjacent to the notch may be different from an angle formed by the second notch surface and the notch reference line.

A depth from the circumferential surface of the first rotor core to the notch valley may be less than or equal to a half of a radius of the first rotor core.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features; numbers, steps, operations, elements, parts, or combinations thereof described in the specification, and do not exclude the presence or addition of one or more other features, numbers, steps, operations, elements, parts, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

Hereinafter, embodiments of the disclosure will be described in detail with reference to the accompanying drawings.

In the description below, an axial direction X indicates a direction parallel to a motor shaft. In addition, a circumferential direction C and a radial direction R indicate a circumferential direction and a radial direction of a circle around the motor shaft, respectively.

Figure 1:
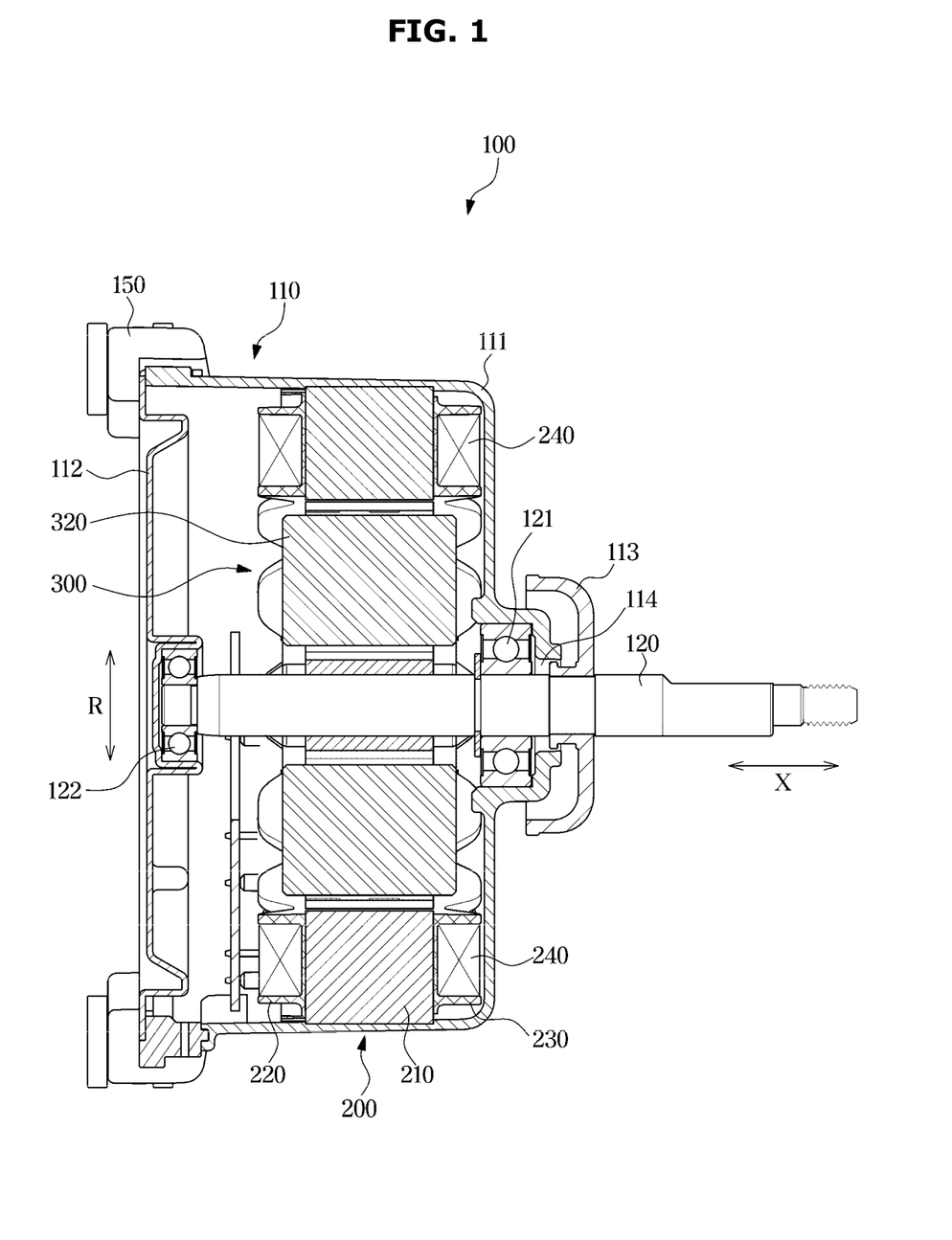
FIG. 1 illustrates a cross-sectional view of a motor according to an embodiment of the disclosure.

As illustrated in FIG. 1, a motor 100 includes a motor housing 110 forming an outer appearance of the motor 100 and a support device 150 supporting the motor housing 110.

The motor housing 110 may include a first housing 111 and a second housing 112 separated in the axial direction X of the motor 100, and a cap 113. The first housing 111 may be fastened to a stator 200.

The stator 200 and a rotor 300 are disposed inside the motor housing 110. The stator 200 may be fixed to the motor housing 110. The rotor 300 is configured to rotate by electromagnetic interaction with the stator 200. The rotor 300 may be disposed inside the stator 200.

A motor shaft 120 is inserted into the rotor 300 to rotate together with the rotor 300. One side of the motor shaft 120 is rotatably supported on the first housing 111 through a bearing 121, and the other side of the motor shaft 120 is rotatably supported on the second housing 112 through a bearing 122. One end of the motor shaft 120 protrudes to the outside of the motor housing 110 through an opening 114 formed on the first housing 111 and an opening of the cap 113.

Figure 2:
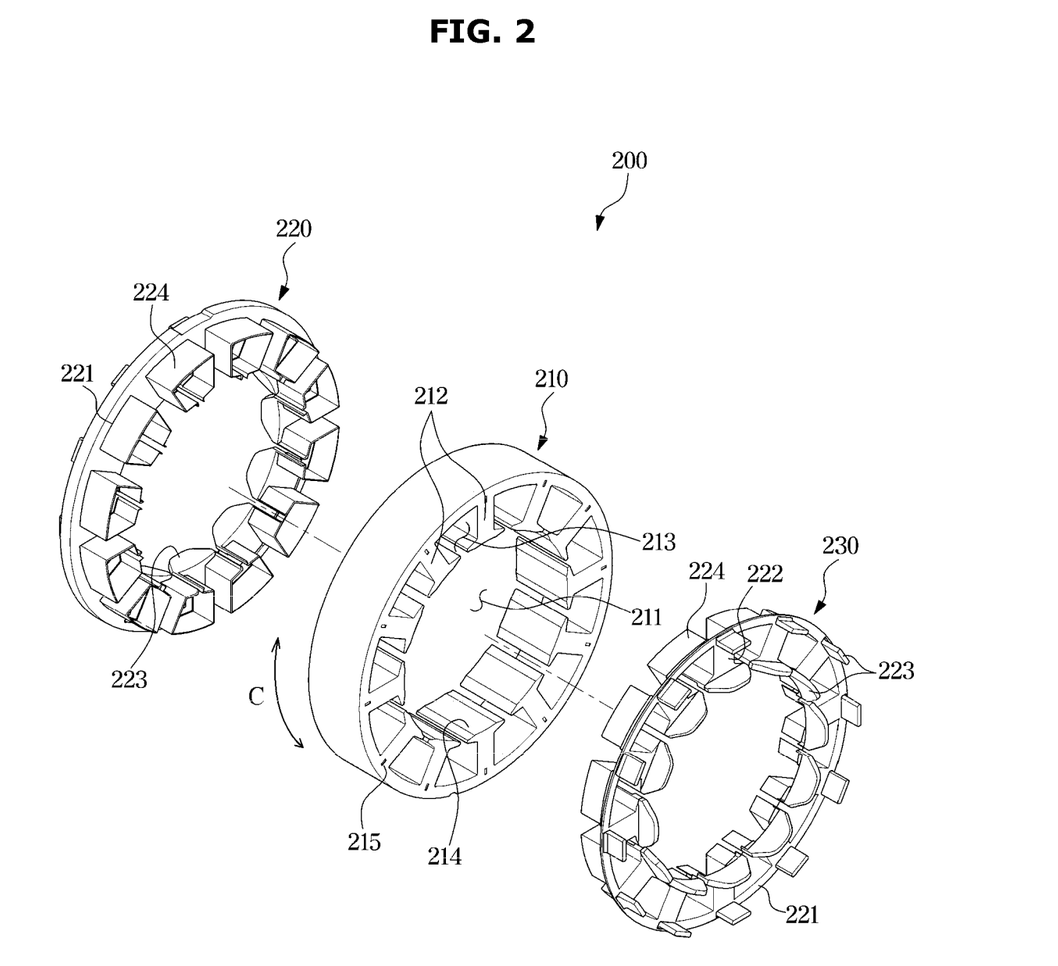
FIG. 2 illustrates an exploded perspective view of a stator of the motor according to an embodiment of the disclosure.

As illustrated in FIGS. 1 and 2, the stator 200 may include a stator body 210, a first insulator 220, a second insulator 230, and a coil 240. The coil 240 is not shown in FIG. 2.

A rotor accommodating portion 211 that is a space for accommodating the rotor 300 is formed on a central portion of the stator body 210. Stator cores 212 are arranged around the rotor accommodating portion 211 along the circumferential direction C of the rotor 300.

The stator cores 212 extend radially from the rotor accommodating portion 211. The stator body 210 may be formed by stacking press-processed iron plates.

The stator cores 212 are arranged at intervals in the circumferential direction C to form stator slots 213 between the stator cores 212. The coil 240 is wound on the stator cores 212, so that the coil 240 is accommodated in the stator slots 213. On inner ends of the stator cores 212 adjacent to the rotor 300, extended core portions 214 in which widths of the stator cores 212 are partially extended are formed. A gap for allowing the rotation of the rotor 300 is formed between inner surfaces of the extended core portions 214 and an outer surface of the rotor 300.

The first insulator 220 and the second insulator 230 are formed of a material having electrical insulation, and are disposed on opposite sides of the stator body 210 with respect to the axial direction X, respectively. The first insulator 220 and the second insulator 230 are coupled to both sides of the stator body 210, respectively, to cover the stator cores 212. The first insulator 220 and the second insulator 230 may be coupled to the stator body 210 by a groove-protrusion structure.

The first insulator 220 and the second insulator 230 each include an annular rim 221, coil support portions 222 arranged corresponding to the stator cores 212, slot support portions 224 formed corresponding to the shape of the stator slot 213, and coil guide portions 223 protruding from the inside and outside of the radial direction R of the coil support portions 222. The coil support portions 222 are spaced apart from each other in the circumferential direction C, so that spaces corresponding to the stator slots 213 are formed between the coil support portions 222.

The slot support portion 224 is formed to protrude toward the stator body 210 so as to cover a portion of an inner circumferential surface of the stator slot 213 in the space corresponding to the stator slot 213.

The coil 240 is wound over the stator cores 212, and the coil support portions 222 and slot support portions 224 of the first insulator 220 and second insulator 230 in a state in which the first insulator 220 and the second insulator 230 are coupled to the stator body 210.

Insertion holes 215 penetrating the stator body 210 in the axial direction X may be formed on the stator body 210. Fastening members such as pins, rivets, and bolts to couple the respective plates forming the stator body 210 may be inserted into the insertion holes 215.

Figure 3:
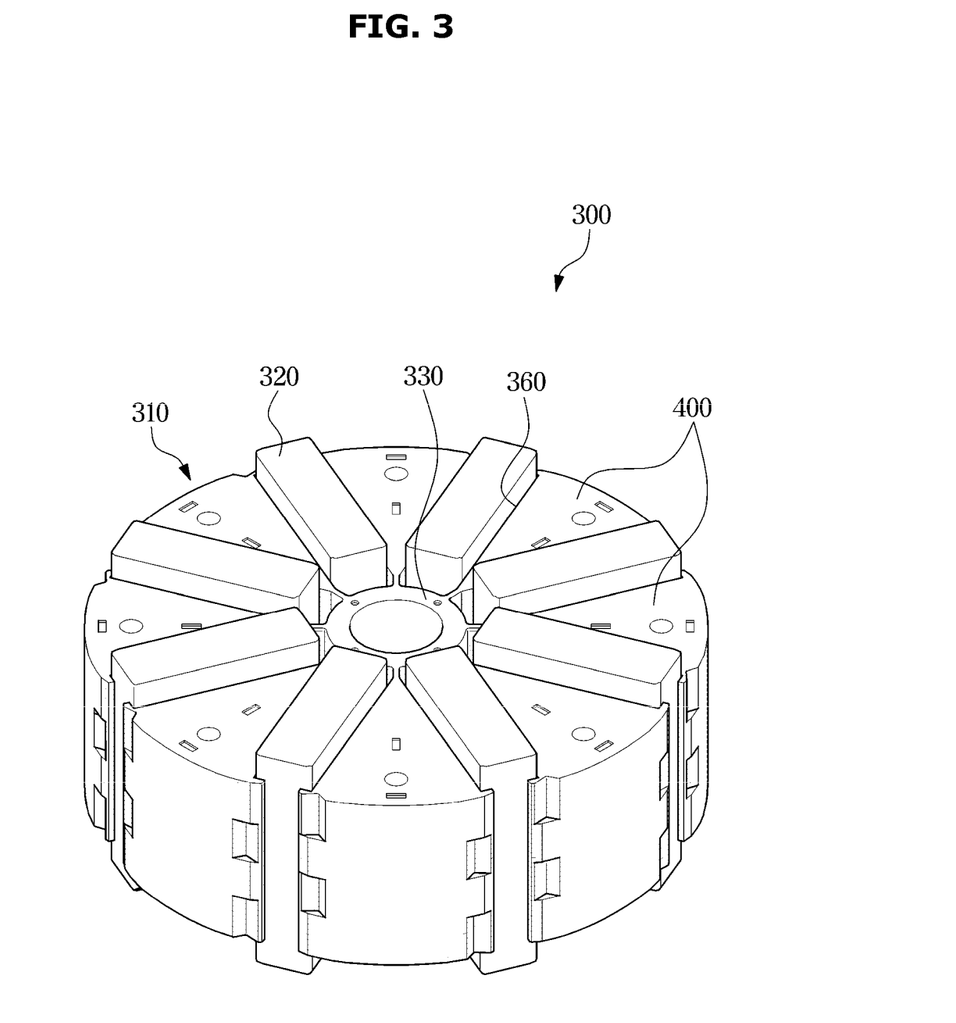
FIG. 3 illustrates a perspective view of a rotor of the motor according to an embodiment of the disclosure.
Figure 4:
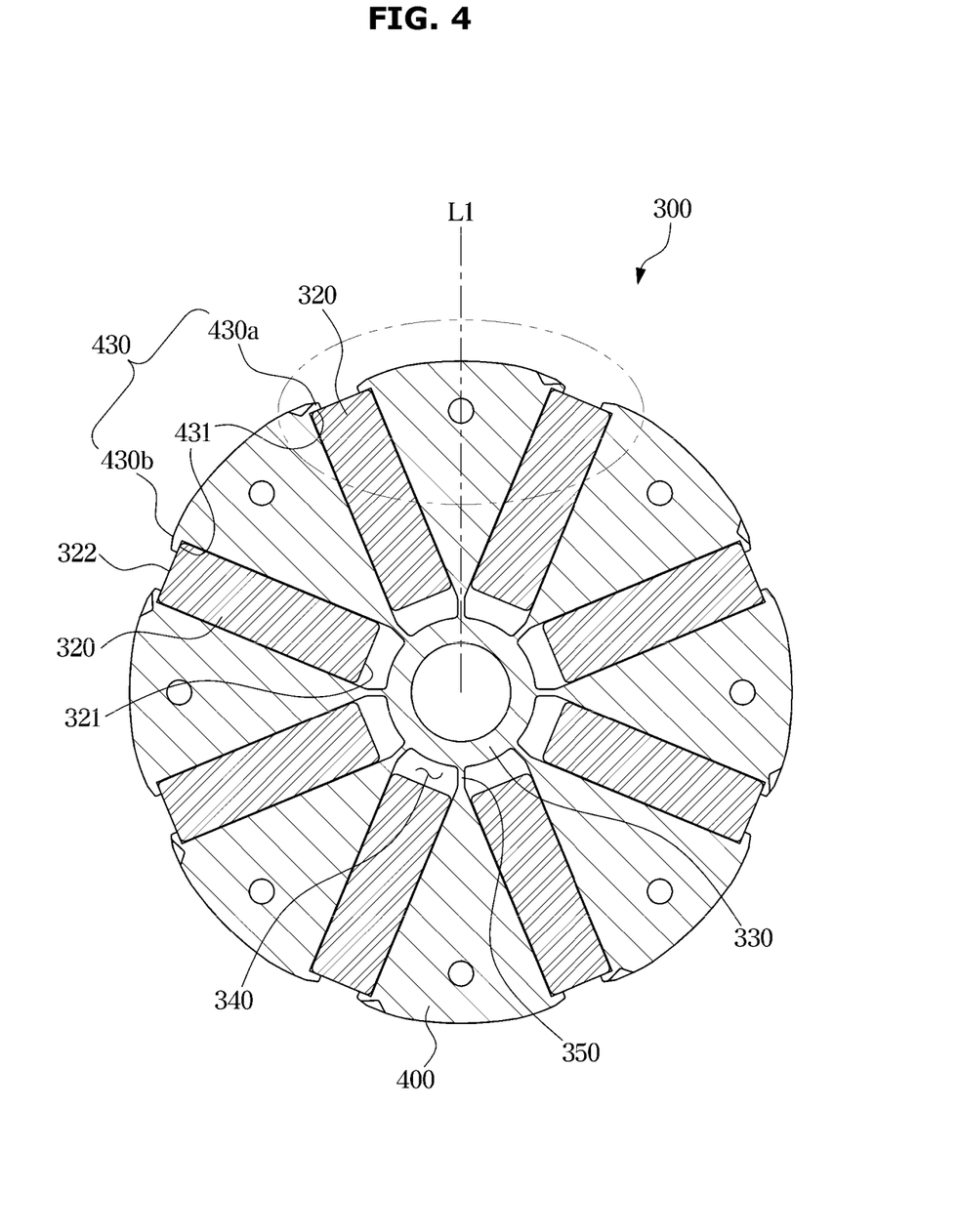
FIG. 4 illustrates a cross-sectional view of the rotor in FIG. 3.

As illustrated in FIGS. 2 to 4, the rotor 300 includes a rotor body 310 disposed in the accommodating portion 211 of the stator body 210, and permanent magnets 320 inserted into the rotor body 310.

The permanent magnets 320 are arranged along the circumferential direction C of the rotor 300 to be radially positioned around the motor shaft 120. The number of the permanent magnets 320 may be changed. The permanent magnet 320 may be a ferrite magnet or a magnet including rare earths such as Neodymium and samarium.

An inner end 321 of the permanent magnet 320 with respect to the radial direction R of the rotor 300 is disposed adjacent to the motor shaft 120, and an outer end 322 of the permanent magnet 320 is disposed adjacent to the stator 200. The inner end 321 and the outer end 322 of the permanent magnet 320 include short sides extending along the circumferential direction C of the rotor 300. The short sides of the permanent magnet 320 are connected to long sides extending along the radial direction R of the rotor 300. The long sides of the permanent magnet 320 have a longer length than the short sides of the permanent magnet 320.

N and S poles of the permanent magnet 320 are arranged along the circumferential direction C of the rotor 300. The first permanent magnet 320 and the second permanent magnet 320 adjacent to each other among the permanent magnets 320 are disposed such that the same poles face each other. According to such a magnetic circuit, a magnetic flux generated from the permanent magnet 320 is concentrated, thereby reducing a size of the motor 100 and at the same time improving performance thereof.

The rotor body 310 includes annular sleeves 330 forming axial holes so that the motor shaft 120 may be inserted and rotor cores 400 connected to the sleeves 330.

The rotor cores 400 are disposed between the permanent magnets 320 to support the permanent magnets 320. The rotor cores 400 form paths (magnetic paths) of magnetic flux generated from the permanent magnets 320. The rotor cores 400 are arranged along the circumferential direction C of the rotor 300 and are spaced apart from each other to form rotor slots 360 for accommodating the permanent magnets 320.

The rotor cores 400 may be connected to the sleeves 330 through bridges 350. The bridges 350 are arranged along the circumferential direction C of the rotor 300 to correspond to the respective rotor cores 400. The bridge 350 may extend radially outwardly from an outer circumference of the sleeve 330 to be connected to an inner end of the corresponding rotor core 400.

The permanent magnets 320 are accommodated in the rotor slots 360 formed between two of the adjacent rotor cores 400, respectively. The permanent magnet 320 is disposed to be spaced apart from the sleeve 330, so that an inner space 340 is formed between the permanent magnet 320 and the sleeve 330. Due to the inner space 340, the magnetic flux of the permanent magnet 320 may be effectively suppressed from leaking toward the motor shaft 120 through the sleeve 330.

The rotor core 400 may include a plurality of permanent magnet fixing portions 430 to fix the permanent magnet 320. A permanent magnet fixing portion 430a may be formed by protruding from a notch 500 of the rotor core 400 to the permanent magnet 320 in the circumferential direction. A permanent magnet fixing portion 430b may be formed by protruding from a circumferential surface 410 of the rotor core 400 to the permanent magnet 320 in the circumferential direction.

The permanent magnet fixing portions 430 are disposed at outer sides of the respective permanent magnets 320 with respect to the radial direction R of the rotor 300. The permanent magnet fixing portion 430 may prevent the permanent magnet 320 from being separated from the rotor body 310 by a centrifugal force when the rotor 300 rotates by supporting an outer end 322 of the permanent magnet 320. The permanent magnet fixing portion 430 may include a permanent magnet support surface 431 in surface contact with the outer end 322 of the permanent magnet 320 to prevent the permanent magnet 320 from being separated.

Figure 5:
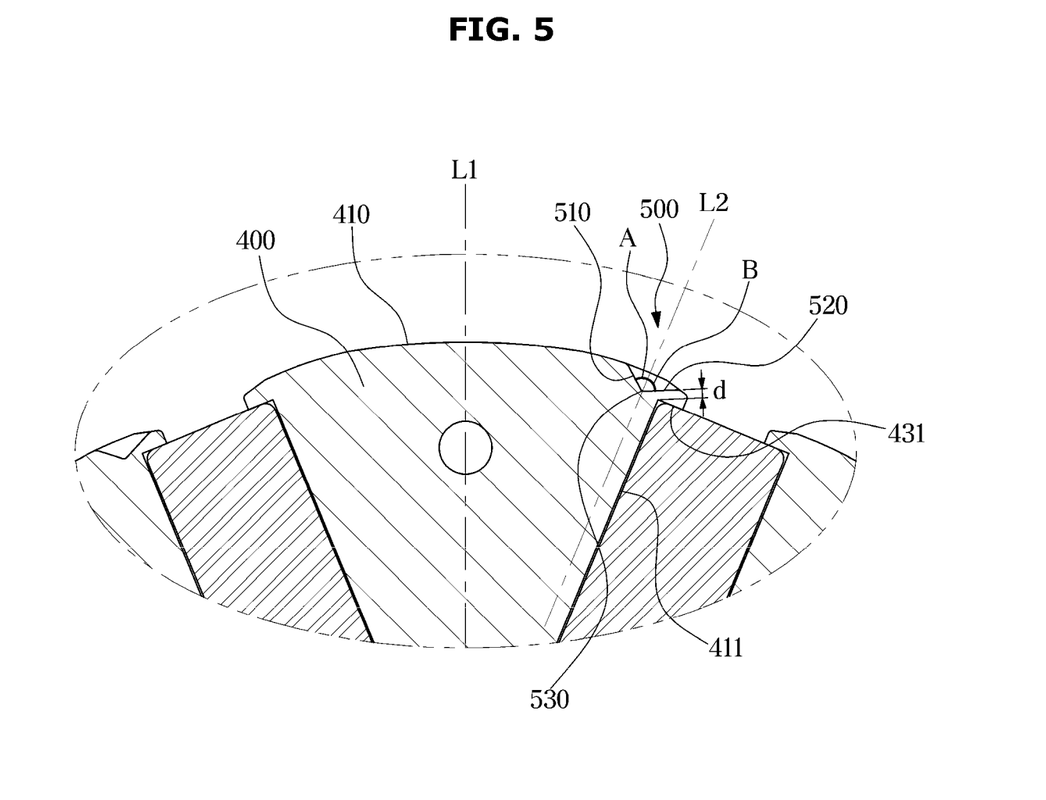
FIG. 5 illustrates an enlarged view of a notch in FIG. 4.

As illustrated in FIG. 5, the rotor core 400 may include the notch 500 formed by being cut on one side of the circumferential surface 410. The notch 500 is formed by being diagonally cut in the inward radial direction R of the rotor core 400 from the circumferential surface 410 of the rotor core 400. Herein, 'inward' refers to a direction from the circumferential surface 410 of the rotor core 400 toward the motor shaft 120. The rotor core 400 may be formed in an asymmetric shape by the notch 500.

The notch 500 may include a first notch surface 510 that is a cross section formed by being cut from the circumferential surface 410 adjacent to a core center line L1 extending in the radial direction R from the motor shaft 120 so as to pass through a center of the rotor core 400. The notch 500 may also include a second notch surface 520 that is a cross section formed by being cut from the circumferential surface 410 adjacent to the permanent magnet 320.

The notch 500 may include a notch valley 530 formed at a point where the first notch surface 510 and the second notch surface 520 come in contact with each other.

An angle A formed by the first notch surface 510 and a reference line L2 passing through the notch valley 530 in parallel with the permanent magnet 320 may be different from an angle B formed by the reference line L2 and the second notch surface 520.

Accordingly, the notch 500 may be formed in an asymmetric shape with respect to the reference line L2.

Hereinafter, a description will be made with respect to a cutting range of the notch 500.

A depth from the circumferential surface 410 of the rotor core 400 to the notch valley 530 in the radial direction R may be less than or equal to a half of a radius of the rotor core 400. That is, the maximum cutting depth of the notch 500 may be a half of the radius of the rotor core 400.

Also, the depth from the circumferential surface 410 of the rotor core 400 to the notch valley 530 in the radial direction R is a minimum range in which a core mold may be manufactured, which may be between 0.2 mm and 0.3 mm. That is, the minimum cutting depth of the notch 500 may be the same as above.

The first notch surface 510 of the notch 500 may be formed inward the core center line L1 so as not to exceed the core center line L1. Herein, 'inward' refers to a direction from the core center line L1 toward the notch 500.

The second notch surface 520 of the rotor core 400 may be formed such that a minimum distance d from a point, where a side surface 411 of the rotor core 400 adjacent to the notch 500 and the permanent magnet support surface 431 of the permanent magnet fixing portion 430 adjacent to the notch 500 come into contact with each other, to the second notch surface 520 is greater than or equal to the thickness of the rotor core 400 in the axial direction X.

Figure 6:
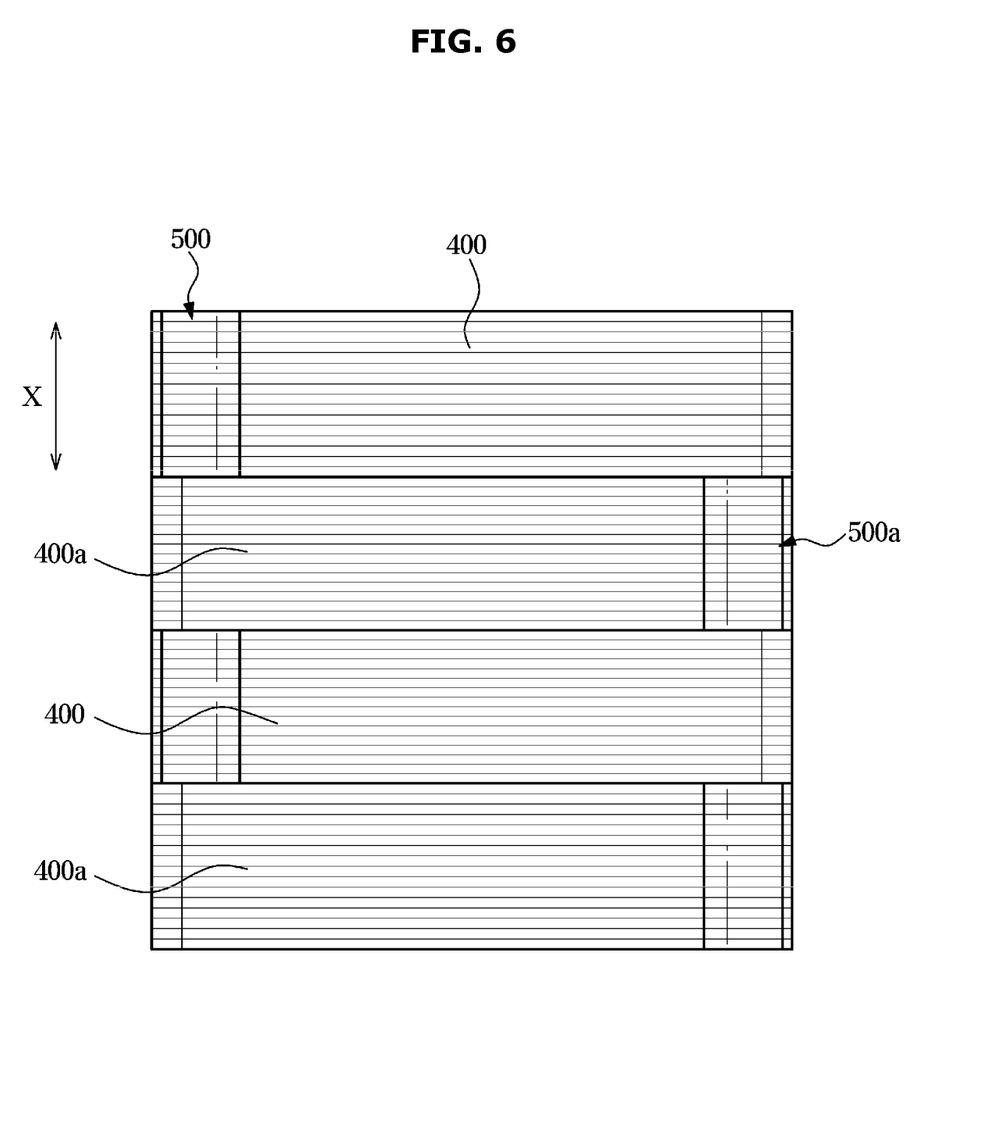
FIG. 6 illustrates a portion of a side of a rotor core in the motor according to an embodiment of the disclosure.
Figure 7:
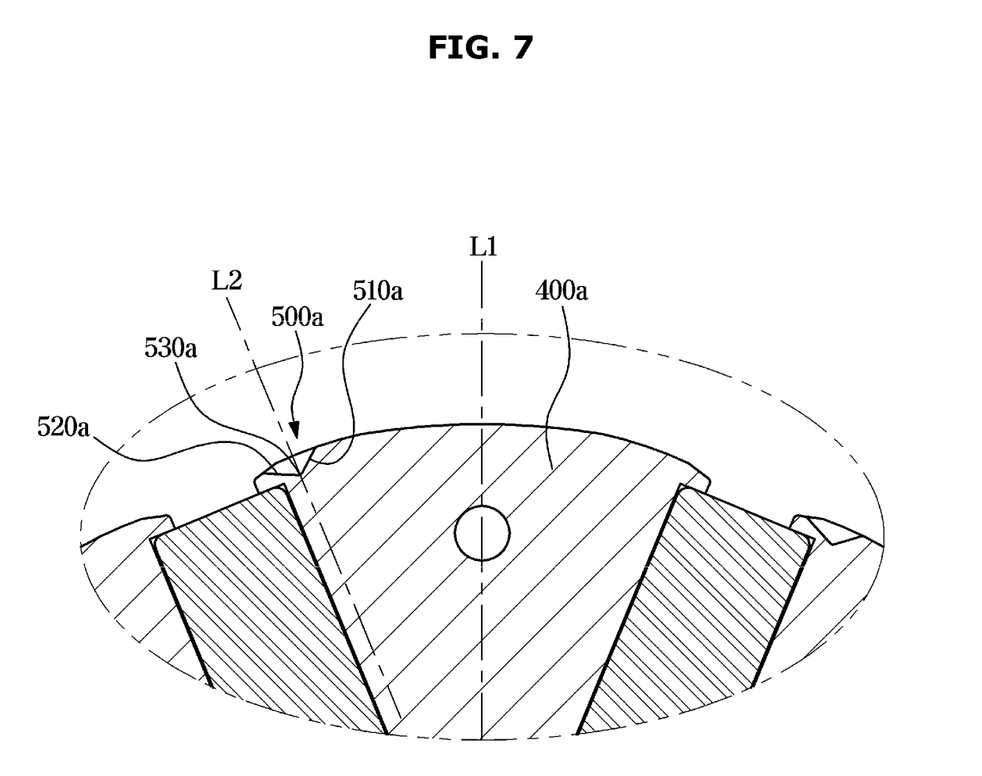
FIG. 7 illustrates an enlarged view of the rotor core having a shape inverted left and right in the motor according to an embodiment of the disclosure.

As illustrated in FIGS. 3, 5, and 7, the rotor 300 includes a plurality of the rotor bodies 310 and the permanent magnets 320 accommodated inside the rotor body 310. The permanent magnets 320 are not shown in FIG. 6. The rotor body 310 includes the annular sleeves 330 forming an axial hole and the rotor cores 400 connected to the sleeves 330. The rotor core 400 may be formed by stacking plate materials formed by pressing a silicon steel sheet.

The rotor core 400 may include the notch 500 formed by being cut on one side of the circumferential surface 410. The rotor core 400 may be formed in an asymmetric shape by the notch 500.

The rotor cores 400 formed in an asymmetrical shape may be arranged to be stacked in the axial direction X together with rotor cores 400a having a shape inverted left and right based on the core center line L1. The respective sleeves 330 and the bridges 350 may also be arranged to be stacked, leading to a stacked arrangement of rotor bodies 310.

The rotor core 400a having a shape inverted left and right may include a notch 500a. The notch 500a may include a first notch surface 510a that is a cross section formed by being cut from a circumferential surface adjacent to the core center line L1 extending in the radial direction R from the motor shaft 120 so as to pass through a center of the rotor core 400a. The notch 500a may also include a second notch surface 520a that is a cross section formed by being cut from the circumferential surface adjacent to the permanent magnet 320. The notch 500a may include a notch valley 530a formed at a point where the first notch surface 510a and the second notch surface 520a come in contact with each other.

Figure 8:
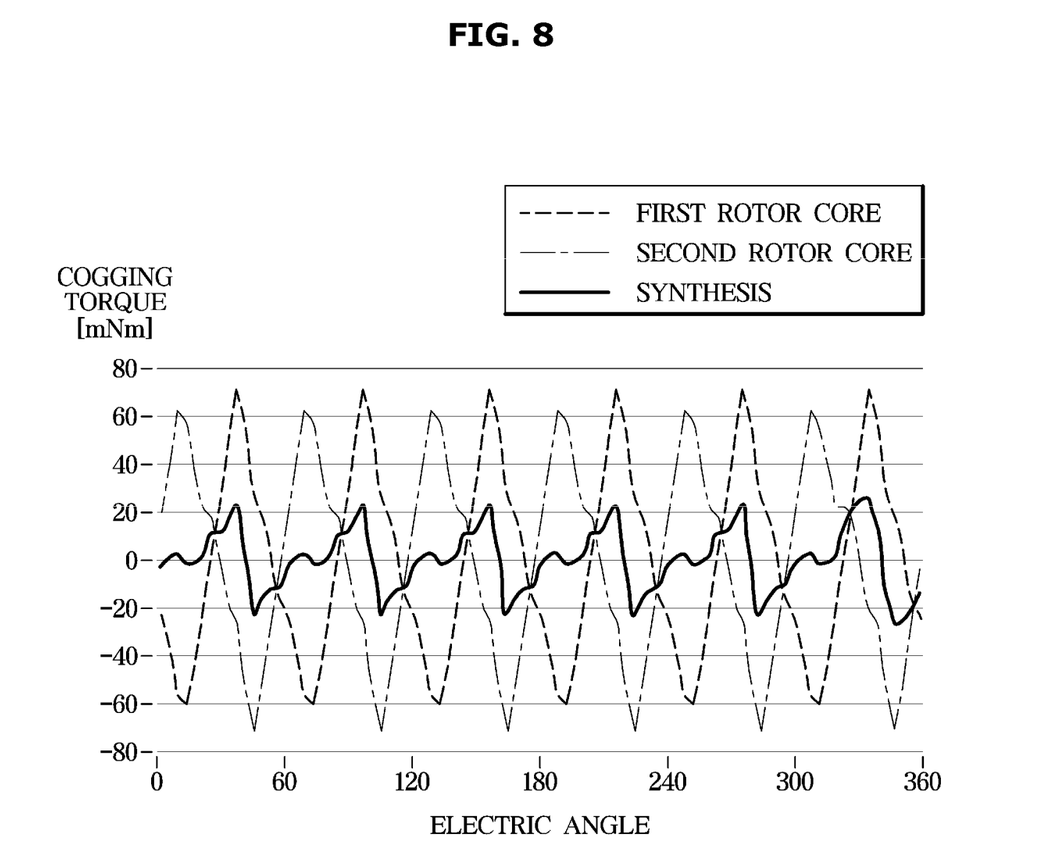
FIG. 8 illustrates a composite waveform of a cogging torque generated when the rotor according to an embodiment of the disclosure is applied.

As illustrated in FIGS. 6 and 8, when the asymmetric rotor cores 400 and 400a including the asymmetric notches 500 and 500a and formed in a shape inverted left and right are arranged to be alternately stacked in the axial direction X, a magnitude of the synthesized cogging torque is reduced.

In the plurality of rotor cores 400 and 400a arranged to be stacked, a phase difference between a cogging torque generated in the rotor core 400 and a cogging torque generated in the rotor core 400a having a shape inverted left and right may occur. The respective cogging torques having a phase difference are synthesized, thereby reducing the magnitude thereof.

Figure 9:
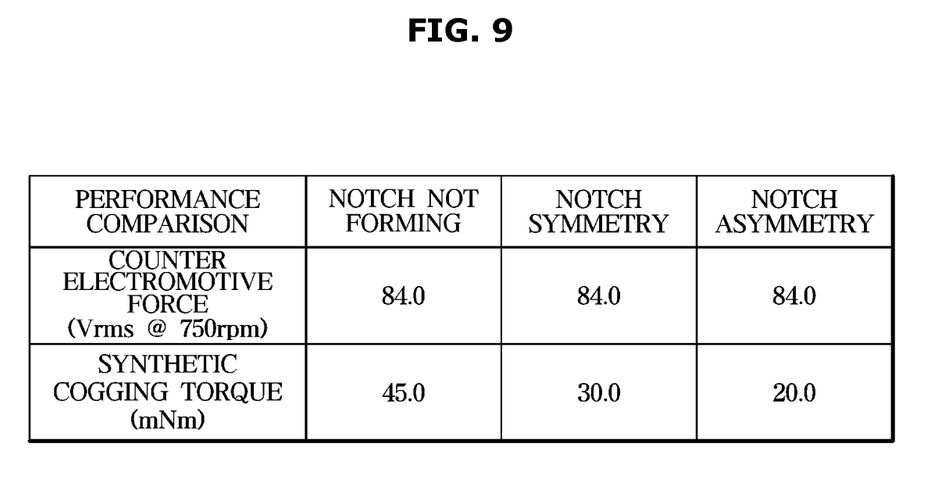
FIG. 9 is a table illustrating counter electromotive forces and synthetic cogging torques generated by the motor according to the presence or absence and shape of the notch in relation to an embodiment of the disclosure.

Hereinafter, an effect generated when the notch 500 of the disclosure is formed asymmetrically will be described with reference to FIG. 9. FIG. 9 illustrates experimental data for counter electromotive forces (Vrms) and synthetic cogging torques (mNm) generated by the motor 100 when the notches 500 and 500a are not formed on the rotor core 400 and 400a, when the notches 500 and 500a are formed symmetrically, and when the notches 500 and 500a are formed asymmetrically.

When he notches 500 and 500a are not formed, a synthetic cogging torque is 45 mNm. When the notches 500 and 500a are formed symmetrically, a synthetic cogging torque is 30 mNm. When the notches 500 and 500a are formed asymmetrically, a synthetic cogging torque is 20 mNm. A counter electromotive force generated by the motor 100 in the respective cases is equally 84 Vrms.

Therefore, by forming the notches 500 and 500a asymmetrically, the generation of the synthetic cogging torque may be minimized as well as the same output is produced.

As is apparent from the above, a rotor and a motor including the same according to the disclosure can produce the same output and at the same time reduce a cogging torque by using an asymmetrical shaped rotor core having an asymmetric notch.

Further, the rotor and the motor including the same according to the disclosure can improve the performance of the motor by reducing the synthesized cogging torque by, alternately stacking rotor cores having a shape inverted left and right in an axial direction.

While the disclosure has been particularly described with reference to exemplary embodiments, it should be understood by those of skilled in the art that various changes in form and details may be made without departing from the spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A motor comprising:
   a stator on which a coil is wound; and
   a rotor configured to rotate by interacting with the stator, wherein the rotor comprises:
      a first permanent magnet and a second permanent magnet disposed in a circumferential direction of the rotor and configured to form a magnetic field, and
      a rotor core disposed between the first permanent magnet and the second permanent magnet, and
   wherein the rotor core comprises a notch formed by being cut inward from a circumferential surface thereof adjacent to the first permanent magnet, wherein the notch comprises:
      a first notch surface formed by being diagonally cut in an inward radial direction of the rotor core from the circumferential surface adjacent to a core center line extending radially from a motor shaft to pass through a center of the rotor core,
      a second notch surface formed by being diagonally cut in the inward radial direction of the rotor core from the circumferential surface adjacent to the first permanent magnet,
      a notch valley formed at a point where the first notch surface and the second notch surface come into contact with each other, and
      an angle formed by the first notch surface and a notch reference line passing through the notch valley in parallel with the first permanent magnet is different from an angle formed by the second notch surface and the notch reference line.

2. The motor according to claim 1, wherein:
   the rotor core is a first rotor core,
   the motor further comprises a second rotor core stacked with the first rotor core in a shaft direction of the motor, and
   the second rotor core has a shape inverted left and right based on the core center line.

3. The motor according to claim 1, wherein a depth from the circumferential surface of the rotor core to the notch valley is less than or equal to a half of a radius of the rotor core.

4. The motor according to claim 1, wherein the first notch surface is formed inward from the core center line.

5. The motor according to claim 1, wherein the rotor core further comprises a permanent magnet fixing portion protruded in the circumferential direction from the notch and configured to fix the first permanent magnet.

6. The motor according to claim 5, wherein:
   the permanent magnet fixing portion is a first permanent magnet fixing portion, and
   the rotor core further comprises a second permanent magnet fixing portion protruded in the circumferential direction from the circumferential surface of the rotor core and configured to fix the second permanent magnet.

7. The motor according to claim 6, wherein:
   the first permanent magnet fixing portion comprises a first permanent magnet support surface in surface contact with the first permanent magnet and configured to prevent the first permanent magnet from being separated, and
   the second permanent magnet fixing portion comprises a second permanent magnet support surface in surface contact with the second permanent magnet and configured to prevent the second permanent magnet from being separated.

8. The motor according to claim 7, wherein a minimum distance from a point where the first permanent magnet support surface and a circumferential portion of the rotor core come into contact with each other to the notch is equal to or greater than a thickness of the rotor core.

9. A cylindrical rotor comprising:
   a plurality of permanent magnets disposed in a circumferential direction and configured to form a magnetic field; and
   a rotor core disposed between the plurality of permanent magnets,
   wherein the rotor core comprises:
      a first portion positioned on one side thereof based on a core center line extending in a radial direction from a motor shaft to pass through a center of the rotor core, and
      a second portion positioned on another side thereof based on the core center line, and
   wherein the first portion comprises a notch of an asymmetrical shape formed by being cut inward from a circumferential surface of the rotor core, wherein the notch comprises:
      a first notch surface formed by being diagonally cut in an inward radial direction of the rotor core from the circumferential surface adjacent to a core center line extending radially from a motor shaft to pass through a center of the rotor core;
      a second notch surface formed by being diagonally cut in the inward radial direction of the rotor core from the circumferential surface adjacent to a first permanent magnet; and
      a notch valley formed at a point where the first notch surface and the second notch surface come into contact with each other.

10. The cylindrical rotor according to claim 9, wherein the notch is formed such that an angle at which the first notch surface is cut is different from an angle at which the second notch surface is cut based on a notch reference line passing through a valley of the notch in parallel with a permanent magnet of the plurality of permanent magnets adjacent to the notch.

11. The cylindrical rotor according to claim 10, wherein:
the rotor core is a first rotor core,
the cylindrical rotor further comprises a second rotor core stacked with the first rotor core in a shaft direction of the cylindrical rotor, and
the second rotor core has a shape inverted left and right with the first rotor core based on the core center line and is configured to reduce a cogging torque.

12. The cylindrical rotor according to claim 10, wherein a maximum cutting depth of the notch in a radial direction is less than or equal to a half of a radius of the rotor core.

13. The cylindrical rotor according to claim 10, wherein an angle at which the first notch surface of the notch is cut is less than or equal to an angle formed by the notch reference line and the core center line.

14. The cylindrical rotor according to claim 9, wherein the rotor core comprises a plurality of permanent magnet fixing portions protruded in the circumferential direction from opposite ends of the rotor core, respectively, and configured to fix the plurality of permanent magnets.

15. A cylindrical rotor comprising:
a plurality of permanent magnets disposed in a circumferential direction and configured to form a magnetic field;
a first rotor core disposed between the plurality of permanent magnets; and
a second rotor core stacked in an axial direction with the first rotor core,
wherein the first rotor core comprises a notch formed on one side of a circumferential surface thereof based on a core center line extending in a radial direction from a motor shaft to pass through a center of the first rotor core, wherein the notch comprises:
a first notch surface formed by being diagonally cut in an inward radial direction of the first rotor core from the circumferential surface adjacent to a core center line extending radially from a motor shaft to pass through a center of the first rotor core,
a second notch surface formed by being diagonally cut in the inward radial direction of the first rotor core from the circumferential surface adjacent to a first permanent magnet,
a notch valley formed at a point where the first notch surface and the second notch surface come into contact with each other, and
an angle formed by the first notch surface and a notch reference line passing through the notch valley in parallel with a permanent magnet of the plurality of permanent magnets adjacent to the notch is different from an angle formed by the second notch surface and the notch reference line, and
wherein the second rotor core has a shape inverted left and right with the first rotor core and configured to reduce a cogging torque.

16. The cylindrical rotor according to claim 15, wherein the notch is cut in an asymmetric shape.

17. The cylindrical rotor according to claim 15, wherein a depth from the circumferential surface of the first rotor core to the notch valley is less than or equal to a half of a radius of the first rotor core.

* * * * *